United States Patent

Sears et al.

[15] 3,645,675
[45] Feb. 29, 1972

[54] AMMONIUM PYROPHOSPHATES, PROCESSES FOR PREPARING, AND USES

[72] Inventors: Paul G. Sears, Lexington, Ky.; Howard L. Vandersall, Ballwin, Mo.

[73] Assignee: Monsanto Company, St. Louis, Mo.

[22] Filed: Dec. 19, 1969

[21] Appl. No.: 886,775

Related U.S. Application Data

[60] Continuation-in-part of Ser. No. 722,499, Dec. 7, 1967, abandoned, which is a division of Ser. No. 514,657, Dec. 17, 1965, abandoned, which is a continuation-in-part of Ser. No. 301,918, Aug. 13, 1963, abandoned.

[52] U.S. Cl. ......................................23/106, 23/107, 71/34
[51] Int. Cl. ......................................................C01b 25/28
[58] Field of Search ..................23/107, 106 A; 71/43, 44, 34

[56] References Cited

UNITED STATES PATENTS 2,781,281   2/1957   Berger.............................23/107 UX

OTHER PUBLICATIONS

Veda et al., " Chemical Abstracts," Vol. 60, 1964, p. 3098.

*Primary Examiner*—Herbert T. Carter
*Attorney*—Herbert B. Roberts and Neal E. Willis

[57] ABSTRACT

Ammonium pyrophosphates of the formula $(NH_4)_{2.7}H_{1.3}P_2O_7$ and $(NH_4)_{3.3}H_{.7}P_2O_7$ are useful as intermediates in the preparation of polymeric water insoluble ammonium polyphosphates and as final products in detergent and fertilizer applications. The new ammonium pyrophosphates are prepared by condensing orthophosphoric acid with a combined ammoniating and condensing agent, e.g., urea, in a molar ratio of nitrogen to phosphorus of 1.4 to 1.75 or 2.5 to 4.0.

6 Claims, No Drawings

AMMONIUM PYROPHOSPHATES, PROCESSES FOR PREPARING, AND USES

This, a continuation-in-part application of Ser. No. 722,499, filed Dec. 7, 1967, now abandoned, which is a divisional application of Ser. No. 514,657 filed Dec. 17, 1965, now abandoned, which is a continuation-in-part of application Ser. No. 301,918, filed Aug. 13, 1963, now abandoned.

This invention pertains to ammonium pyrophosphates and process for preparing the same.

It is an object of this invention to provide new and useful ammonium pyrophosphate compounds.

It is a further object of this invention to provide processes for preparing ammonium pyrophosphate compounds.

These and other objects will become apparent from the following detailed description.

The term "ammoniacal nitrogen" refers to that nitrogen which is present in the form of ammonium ions and is capable of being removed by the hydrogen form of a strong cation exchange resin, i.e., the hydrogen form of a sulfonate polystyrene resin. The term "noammoniacal nitrogen" or "nuclear nitrogen" refers to nitrogen incapable of being removed in the manner of true ammonium nitrogen.

This invention is directed to new and useful ammonium pyrophosphates of the formula $(NH_4)_{2.7}H_{1.3}P_2O_7$ and $(NH_4)_{3.3}H_{.7}P_2O_7$ which are useful as intermediates in preparing substantially water-insoluble ammonium polyphosphates. Pyrophosphates are compounds having the general formula $M_4P_2O_7$ wherein M can be a single metal, e.g., calcium, magnesium, potassium, sodium, etc., or hydrogen or ammonia or a mixture thereof. The P—O—P type linkage is evidenced in the herein described products by NMR spectra which indicates substantially no P—N—P type linkages and no ortho, or long chain P—O—P type groups and by infrared spectra which indicates P—O—P type linkages but does not indicate substantially any P—N type linkages.

It should be noted that substantially all of the nitrogen in these pyrophosphates is present as the ammoniacal nitrogen and there is substantially no nuclear nitrogen present.

The pyrophosphates of this invention are prepared by reacting an orthophosphoric acid with combined condensing and ammoniating agent at elevated temperature.

Typical of the ammoniating and condensing agents which are suitable for use in the instant invention are those nitrogenous compounds which are capable of condensing the phosphorous-containing reactant or reactants at temperatures in the range between about 100° C. and about 260° C. and releasing ammoniacal nitrogen. In particular are the compounds containing one or more amide groups, i.e., a compound resulting from replacement of one or more atoms of hydrogen in ammonia by univalent acid radicals, and particularly the primary amides containing the elements carbon and/or sulfur, nitrogen, oxygen and hydrogen as well as containing no carbon—carbon bonds. Preferably the compounds are noncyclic structures and there are few, if any, compounds which contain three or more amide groups which can be used in practicing the present invention. Especially preferred are low molecular weight nitrogenous compounds, i.e., having a molecular weight below about 200, and containing at least one but no more than two of the following radicals: carbamyl, carbamic, sulfamino, sulfamyl and ureido. As being illustrative of such compounds are urea, ammonium carbamate, biuret, sulfamide, sulfamic acid, ammonium sulfamate, guanyl urea, methyl urea, amino urea, 1-3-di-amino urea, biurea and the like, with urea, because of its relative inexpensiveness and ready availability, being particularly preferred.

Usually, any concentration of orthophosphoric acid can, in general, be used although it is preferred that concentrations above about 40 percent by weight be used and particularly preferred are concentrations of 85 percent and higher.

In general, it is usually only necessary to add the combined ammoniating and condensing agent to the orthophosphoric acid, preferably admixing the reactants, and heat the admixture for the reaction to take place. In most cases, the reaction will occur between about 110° C. to about 140° C. with the temperature being maintained for a sufficient time to produce the reaction product Usually the reaction is initiated as soon as this temperature range is reached although in some cases it may be necessary to maintain the temperature of 1 hour or even longer, that is, up to about 3 hours.

Depending upon the nitrogen to phosphorus molar ratio of the reactants used, the reaction product produced is, in general, an ammonium pyrophosphate or mixtures of ammonium pyrophosphates. For example, when using a nitrogen to phosphorus molar ratio of reactants of about 1 the diammonium pyrophosphate is formed.

When using a ratio of between about 1.4 to about 1.75 a new and novel ammonium pyrophosphate salt is formed having an empirical formula of $(NH_4)_{2.7}H_{1.3}P_2O_7$ which exhibits a distinctive X-ray diffraction pattern and is relatively water-soluble.

When using a ratio of between about 2.50 and 4.0 another new and novel ammonium pyrophosphate salt is formed having an empirical formula of $(NH_4)_{3.3}H_{.7}P_2O_7$ which exhibits a distinctive X-ray diffraction pattern and is relatively water-soluble It should be noted that when using molar ratios other than the foregoing, mixtures of various ammonium pyrophosphates are formed.

The product, an ammonium pyrophosphate or a mixture of ammonium pyrophosphates, can then be further heat-treated with an additional combined ammoniating and condensing agent at temperatures and for periods of time sufficient to form water insoluble ammonium polyphophates of the formula $H_{(n-m)+2}(NH_4)_mP_nO_{3n+1}$ wherein n is an integer having a value greater than 10, m/n has an average value between about 0.7 and 1.1 and the maximum value of m is equal to m+2. The ammonium polyphosphates are more fully described in U.S. Pat. No. 3,397,035 and, or Canadian Pat. No. 822,594 both of which are incorporated herein by reference. When substantially complete conversion to the polyphoshpate is desired, temperatures between about 170° C. and about 260° C. for periods of time between about 15 minutes and 3 hours are preferred, with temperatures of between about 180° C. to about 220° C. for about 1 to 2 hours being particularly preferred, to produce the water-insoluble ammonium polyphosphate compounds- Usually amounts of the combined ammoniating and condensing agent and the ammonium pyrophosphate between about 1 to about 7 on a nitrogen )from the combined ammoniating and condensing agent) to phosphorus (from the ammonium pyrophosphates) molar ratio basis of reactants are suitable with a molar ratio of between about 1 and about 3 being particularly preferred.

The new and novel ammonium pyrophosphates of this invention, i.e., those having the empirical formula $(NH_4)_{2.7}H_{1.3}P_2O_7$ and $(NH_4)_{3.3}H_{.7}P_2O_7$ are useful, also, as boulders in synthetic detergents especially such compositions containing anionic surface active agents, nonionic surface active agents and mixtures thereof, plant nutrients, i.e., fertilizer materials, and as intermediates in the preparation of water-insoluble ammonium polyphosphates.

The following examples are presented to illustrate the invention, with parts by weight being used in the examples unless otherwise indicated.

EXAMPLE I

In this reaction 85 percent orthophosphoric acid was added to the reactor and stirred while urea was added. The proportionate amounts of reactants used were a nitrogen to phosphorus molar ratio of about 3.25. The admixture was heated to about 123° C. at which temperature an exothermic reaction was initiated and the temperature was raised to and maintained at about 1302 C. for about 45 minutes. The product, a water-soluble solid mass, with the empirical formula $(NH_4)_{3.3}H_{.7}P_2O_7$ gives the distinctive X-ray diffraction pattern illustrated on the following page.

The ammonium pyrophosphate was then heat-treated with urea using proportionate amounts on a nitrogen (from urea) to phosphorus( (from ammonium pyrophosphates) molar ratio basis of about 1 at about 210° C. for 1 hour and resulted in an ammonium polyphosphate of the formula $H_{(n-m)+2}(NH_4)_m P_n O_{3n+1}$ (further described above) analyzing as follows:

| Ammoniacal Nitrogen to Phosphorus Molar | Average Chain Length | Solubility |
|---|---|---|
| 0.97 | 225 | 3.01 |

[1]. Determined by end group titration method, supra.

X-ray Diffraction Data[a]

for $(NH_4)_{3.3}H_{.7}P_2O_7$

| Line[b] | d, A |
|---|---|
| 1 | 3.32 |
| 2 | 5.47 |
| 3 | 3.25 |
| 4 | 5.71 |
| 5 | 5.03 |
| 6 | 3.87 |
| 7 | 3.05 |
| 8 | 3.17 |
| 9 | 4.62 |
| 10 | 3.37 |
| 11 | 3.37 |
| 12 | 3.72 |
| 14 | 6.69 |
| 14 | 5.37 |
| 15 | 3.75 | a CuK α Radiation

[b] 15 strongest lines in order of decreasing intensity.

The ammonium polyphosphate product exhibited the following X-ray diffraction pattern:

X-ray Diffraction Data[a]

for Ammonium Polyphosphates

| Line[b] | d, A |
|---|---|
| 1 | 6.06 |
| 2 | 5.47 |
| 3 | 3.83 |
| 4 | 3.50 |
| 5 | 3.24 |
| 6 | 3.42 |
| 7 | 2.30 |
| 8 | 3.59 |
| 9 | 2.82 |
| 10 | 2.75 |

[a] CuK α Radiation

[b] 10 strongest lines in order of decreasing intensity.

EXAMPLE II

In this reaction the same reactants used in Example I were used in proportionate amounts on a nitrogen to phosphorus molar ratio of about 1.6. The product, a water-soluble solid mass, with the empirical formula $(NH_4)_{2.7}H_{1.3}P_2O_7$ gives the following distinctive X-ray diffraction pattern:

X-ray Diffraction Data[a]

for $(NH_4)_{2.7}H_{1.3}P_2O_7$

| Line[b] | d, A |
|---|---|
| 1 | 5.40 |
| 2 | 4.90 |
| 3 | 3.23 |
| 4 | 3.20 |
| 5 | 6.28 |
| 6 | 3.78 |
| 7 | 4.27 |
| 8 | 2.75 |
| 9 | 2.83 |
| 10 | 9.71 |
| 11 | 3.60 |
| 12 | 3.39 |
| 13 | 4.21 |
| 14 | 3.11 |
| 15 | 3.32 |

[a] CuK α Radiation

[b] 15 strongest lines in order of decreasing intensity.

This ammonium pyrophosphate was then heat-treated with urea using proportionate amounts on a nitrogen (from urea) to phosphorus (from ammonium pyrophosphate) molar ratio basis of about 1 at about 210° C. for about 1 hour and resulted in an ammonium polyphosphate analyzing as follows:

| Ammoniacal Nitrogen to Phosphorus Molar Ratio | Average chain length as Determined by end group titration method, supra |
|---|---|
| 0.96 | 95 |

This product gave the same X-ray diffraction pattern as the ammonium polyphosphate obtained in Example I and is useful as a fire-retardant additive in paint formulations.

We claim:

1. An ammonium pyrophosphate composition having an empirical formula $(NH_4)_{2.7}H_{1.3}P_2O_7$ and the following distinctive X-ray diffraction pattern with CuK α radiation:

| Line | d, A. |
|---|---|
| 1 | 5.40 |
| 2 | 4.90 |
| 3 | 3.23 |
| 4 | 3.20 |
| 5 | 6.28 |
| 6 | 3.78 |
| 7 | 4.27 |
| 8 | 2.75 |
| 9 | 2.83 |
| 10 | 9.71 |
| 11 | 3.60 |
| 12 | tj 3.39 |
| 13 | 4.21 |
| 14 | 3.11 |

2. A method for preparing the composition of claim 1 comprising reacting orthophosphoric acid and a nitrogeneous combined ammoniating and condensing agent containing at least one amide group in a molar ratio of nitrogen to phosphorus of between about 1.4 and about 1.75 at a temperature from about 110° C. to about 140° C.

3. The method according to claim 2 wherein the combined ammoniating and condensing agent is urea.

4. An ammonium pyrophosphate composition having an empirical formula $(NH_4)_{3.3}H_{.7}P_2O_7$ and the following distinctive X-ray diffraction pattern with CuK α radiation:

| Line | d, A. |
|---|---|
| 1 | 3.32 |
| 2 | 5.47 |
| 3 | 3.25 |
| 4 | 5.71 |
| 5 | 5.03 |
| 6 | 3.87 |
| 7 | 3.05 |
| 8 | 3.17 |
| 9 | 4.62 |
| 10 | 2.40 |
| 11 | 3.37 |
| 12 | 3.72 |
| 13 | 6.69 |
| 14 | 5.37 |
| 15 | 3.75 |

We claim:

1. An ammonium pyrophosphate composition having an empirical formula $(NH_4)_{2.7}H_{1.3}P_2O_7$ and the following distinctive X-ray diffraction pattern with CuK $\alpha$ radiation:

| Line | d, A. |
|---|---|
| 1 | 5.40 |
| 2 | 4.90 |
| 3 | 3.23 |
| 4 | 3.20 |
| 5 | 6.28 |
| 6 | 3.78 |
| 7 | 4.27 |
| 8 | 2.75 |
| 9 | 2.83 |
| 10 | 9.71 |
| 11 | 3.60 |
| 12 | 3.39 |
| 13 | 4.21 |
| 14 | 3.11 |
| 15 | 3.32 |

2. A method for preparing the composition of claim 1 comprising reacting orthophosphoric acid and a nitrogeneous combined ammoniating and condensing agent containing at least one amide group in a molar ratio of nitrogen to phosphorus of between about 1.4 and about 1.75 at a temperature from about 110° C. to about 140° C.

3. The method according to claim 2 wherein the combined ammoniating and condensing agent is urea.

4. An ammonium pyrophosphate composition having an empirical formula $(NH_4)_{3.3}H_{.7}P_2O_7$ and the following distinctive X-ray diffraction pattern with CuK$\alpha$ radiation:

| Line | d, A. |
|---|---|
| 1 | 3.32 |
| 2 | 5.47 |
| 3 | 3.25 |
| 4 | 5.71 |
| 5 | 5.03 |
| 6 | 3.87 |
| 7 | 3.05 |
| 8 | 3.17 |
| 9 | 4.62 |
| 10 | 2.40 |
| 11 | 3.37 |
| 12 | 3.72 |
| 13 | 6.69 |
| 14 | 5.37 |
| 15 | 3.75 |

5. A method for preparing the composition of claim 4 comprising reacting orthophosphoric acid and a nitrogeneous combined ammoniating and condensing agent containing at least one amide group in a molar ratio of nitrogen to phosphorus of between about 2.5 and about 4.0 at a temperature of about 110° C. to about 140° C.

6. The method according to claim 5 wherein the combined ammoniating and condensing agent is urea.

* * * * *